(12) United States Patent
Mukherji

(10) Patent No.: US 11,840,849 B2
(45) Date of Patent: Dec. 12, 2023

(54) LIGHT WEIGHT COMPOSITE DECK PANELLING

(71) Applicant: SP Advanced Engineering Materials Pvt. Ltd., Mumbai (IN)

(72) Inventor: Arindam Mukherji, Thane (IN)

(73) Assignee: SP ADVANCED ENGINEERING MATERIALS PVT. LTD., Mumbai (IN)

( * ) Notice: Subject to any disclaimer, the term of this patent is extended or adjusted under 35 U.S.C. 154(b) by 71 days.

(21) Appl. No.: 17/242,177

(22) Filed: Apr. 27, 2021

(65) Prior Publication Data

US 2021/0332598 A1 Oct. 28, 2021

(30) Foreign Application Priority Data

Apr. 27, 2020 (IN) .............................. 202021017975

(51) Int. Cl.
| | | |
|---|---|---|
| E04F 15/10 | (2006.01) | |
| B29C 70/48 | (2006.01) | |
| B29C 70/84 | (2006.01) | |
| E04F 15/02 | (2006.01) | |

(52) U.S. Cl.
CPC ............ *E04F 15/105* (2013.01); *B29C 70/48* (2013.01); *B29C 70/84* (2013.01); *E04F 15/02044* (2013.01); *E04F 15/10* (2013.01)

(58) Field of Classification Search
CPC ... E04F 15/105; E04F 15/02044; E04F 15/10; E04F 15/102; B29C 70/48; B29C 2043/3649; B29C 70/84; B29C 70/865; B32B 2260/023; B32B 2260/046; B32B 2262/101; B32B 2262/106; B32B 2264/0271; B32B 2264/0278; B32B 2266/0228; B32B 2266/025; B32B 2307/516; B32B 2307/518; B32B 2307/54; B32B 2307/718; B32B 2607/00; B32B 3/18; B32B 5/18; B32B 5/26; B32B 3/10

See application file for complete search history.

(56) References Cited

U.S. PATENT DOCUMENTS

| | | | | |
|---|---|---|---|---|
| 4,013,614 A | * | 3/1977 | Self .......................... | C08K 3/34 156/332 |
| 5,302,634 A | * | 4/1994 | Mushovic ........... | B29C 44/3446 521/137 |
| 5,508,315 A | * | 4/1996 | Mushovic .................. | C08J 9/32 521/137 |
| 5,604,266 A | * | 2/1997 | Mushovic .................. | C08J 9/32 521/137 |
| 5,792,552 A | * | 8/1998 | Langkamp ................ | B32B 3/28 249/176 |
| 5,891,563 A | * | 4/1999 | Letts ......................... | B32B 5/18 428/140 |
| 10,000,922 B1 | * | 6/2018 | Letts ..................... | B32B 27/304 |

(Continued)

*Primary Examiner* — Phi D A
(74) *Attorney, Agent, or Firm* — Ryan Alley IP

(57) ABSTRACT

A light weight composite deck panel comprising at least two pre-defined shaped and sized foams that are encapsulated with multiple layers of the bi-directionally and/or uni-directionally oriented synthetic glass fabric and the resin system and the encapsulated foams are arranged in a pre-defined configuration of the deck with at least one joint; said composite deck panel is cured. A process and assembly for manufacturing the light weight composite deck panels of the invention is disclosed.

8 Claims, 3 Drawing Sheets

(56) References Cited

U.S. PATENT DOCUMENTS

| | | | |
|---|---|---|---|
| 2002/0106503 A1* | 8/2002 | Monk | B32B 5/18 |
| | | | 428/317.1 |
| 2005/0261464 A1* | 11/2005 | Schorr | C09D 167/06 |
| | | | 528/272 |
| 2007/0256379 A1* | 11/2007 | Edwards | B32B 5/145 |
| | | | 52/309.9 |
| 2008/0127607 A1* | 6/2008 | Schiffmann | E04B 1/0007 |
| | | | 52/794.1 |
| 2009/0165411 A1* | 7/2009 | Schiffmann | B29D 99/0014 |
| | | | 52/309.4 |
| 2009/0181207 A1* | 7/2009 | Michalik | B29C 48/07 |
| | | | 264/176.1 |
| 2011/0244213 A1* | 10/2011 | Jones | B32B 3/30 |
| | | | 156/245 |
| 2011/0297291 A1* | 12/2011 | Hauber | B32B 5/022 |
| | | | 156/346 |
| 2013/0207413 A1* | 8/2013 | Lookebill | B29D 99/0021 |
| | | | 428/483 |
| 2015/0240492 A1* | 8/2015 | Teng | E04C 5/073 |
| | | | 427/209 |
| 2017/0044759 A1* | 2/2017 | Kreizinger | B32B 7/12 |
| 2017/0138703 A1* | 5/2017 | Wadley | B32B 5/26 |
| 2017/0218635 A1* | 8/2017 | O'Leary | B32B 27/06 |
| 2018/0311915 A1* | 11/2018 | Mukherji | B32B 27/32 |
| 2019/0186124 A1* | 6/2019 | Hubbard | B32B 15/14 |
| 2019/0270263 A1* | 9/2019 | Mukherji | B29D 99/0003 |
| 2020/0141118 A1* | 5/2020 | Kreizinger | B32B 27/40 |
| 2021/0198527 A1* | 7/2021 | Hubbard | C09J 7/38 |
| 2022/0001642 A1* | 1/2022 | Hubbard | B32B 27/40 |

\* cited by examiner

LIGHT WEIGHT COMPOSITE DECK PANELLING

RELATED APPLICATIONS

This application claims priority under 35 U.S.C. § 119 to IN Application 202021017975, filed Apr. 27, 2020 such IN Application also being incorporated by reference herein in its entirety.

FIELD

The present invention is related to the field of deck panelling.

BACKGROUND

The conventional engineered structures, particularly structural panels, for example, general deck panel structures including floors, walls, roofs, bridges, bridge roadway decking and other structures are typically made up of metal or concrete or by cement fabrication techniques. However, these structural panels are quite heavy. Further, cement or concrete structural panels are not rapidly manufactured or economical or are not easily inspectable for defects. Furthermore, such structures, when pre-fabricated are of considerable weight and volume that transport cost can be extremely high.

To reduce the weight, the structural panels are made up of thermoplastic material by injection moulding or PVC foam boards. However, it compromises the strength of the structural panels. Mainly, it is used in vertical columns and not as deck panels. It has less strength and shelf life.

Thus, there is a need to develop improved composite deck panels, which are light weight with improved strength and resistance properties, at the same time can be economically and easily fabricated and yet reproducible.

SUMMARY

Particularly, the present invention relates to light weight composite deck panels with improved properties and durability.

The present invention also relates to an assembly for manufacturing the light weight composite deck panels.

The present invention also relates to a process of manufacturing the light weight composite deck panels.

Accordingly, the main object of the present invention is to provide composite deck panels which are light weight.

Another object of the present invention is to provide the light weight composite deck panels with improved strength and resistance properties.

Yet another object of the invention is to provide the light weight composite deck panels, which can be used in dynamic applications that have deck panelling structures including floors, walls, roofs, bridges, bridge roadway decking, etc.

Yet another object of the invention is to provide the light weight composite deck panels, which can be easy to handle or assemble and have ability of cyclic use repeatedly.

Yet another object of the invention is to provide the light weight composite deck panels, which can be used as columns and beams.

An additional object of the present invention is to provide an assembly to manufacture the light weight composite deck panels which are very simple and reproducible.

Another additional object of the present invention is to provide a process of manufacturing the light weight composite deck panels which is very simple and reproducible.

DETAILED DESCRIPTION

Figure 1A:
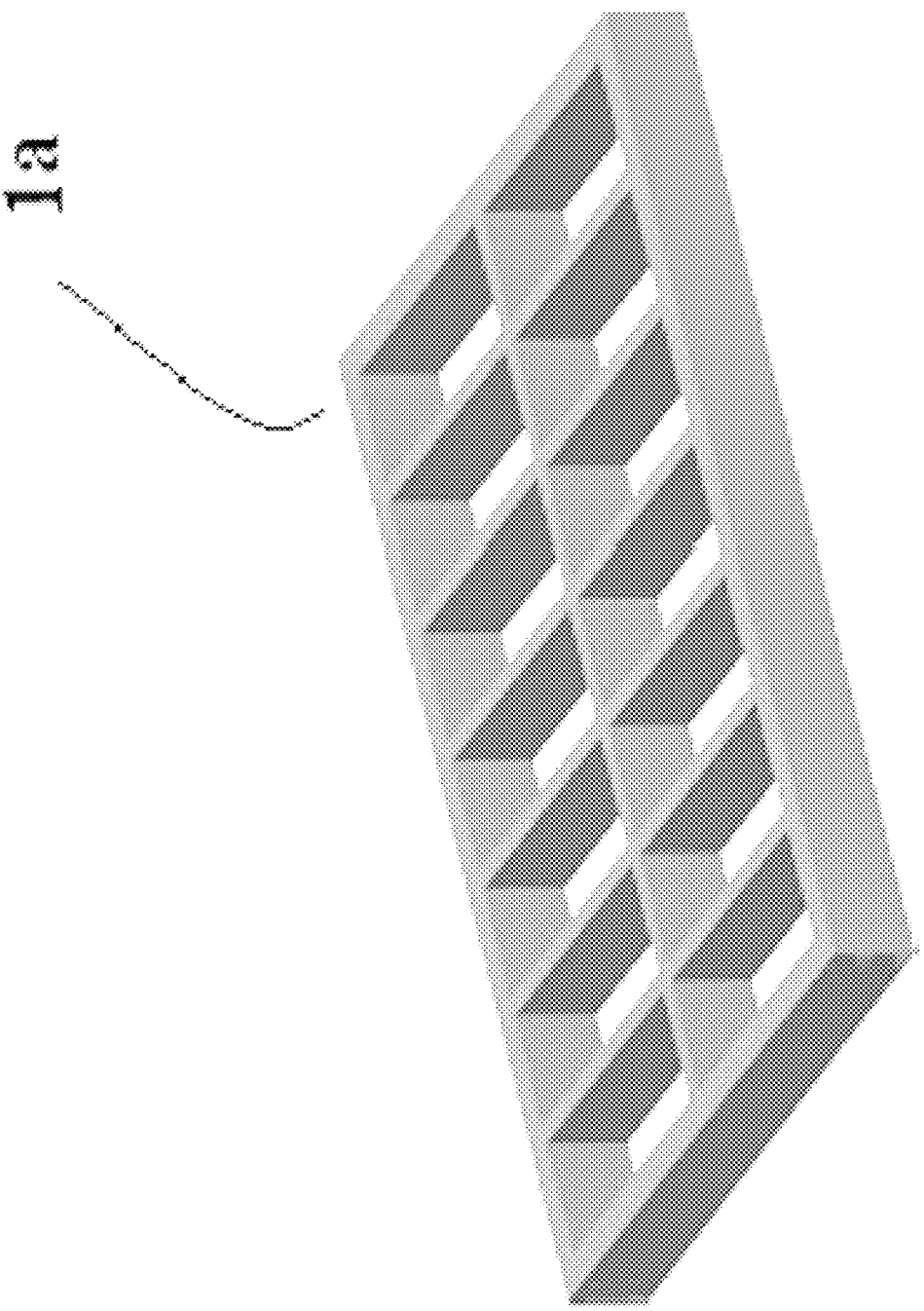
FIG. 1A illustrates one of the profiles of the deck panel structure (1).
Figure 1B:
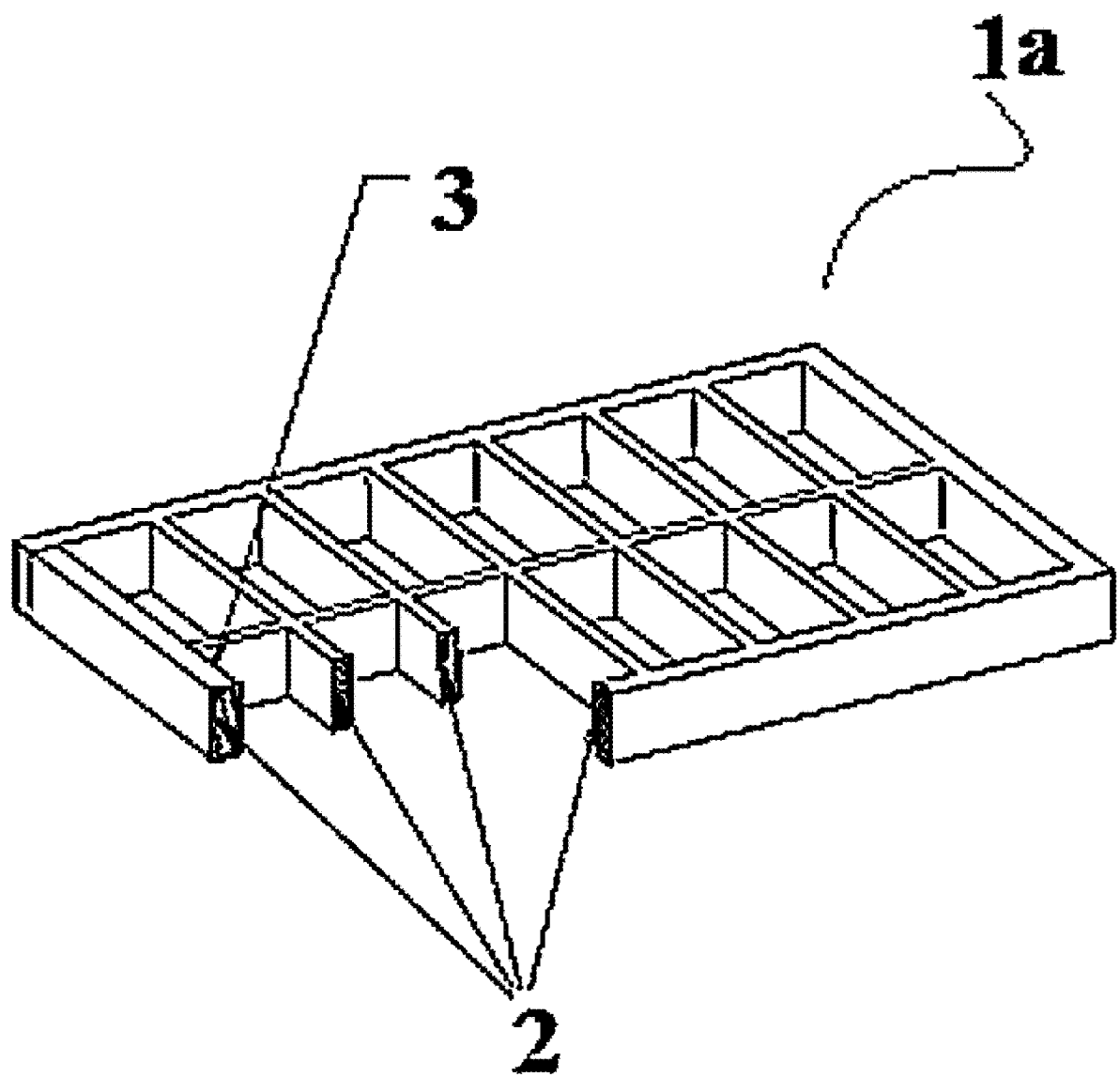
FIG. 1B illustrates the cutting plane section view of one of the edges of the profile of the deck panel structure (1).

FIG. 1A illustrates one of the profiles of the deck panel structure (1) where, the multiple foams are encapsulated by the multiple layers of the bi-directionally or the uni-directionally oriented synthetic glass fabric and the resin system arranged in an illustrated shape and configuration of the deck panel structure (1). The deck panel structure (1) is cured at ambient temperature FIG. 1B illustrates the cutting plane section view of one of the edges of the profile of the deck panel structure (1), specifically foam (2) and encapsulated layer (3) made up of the multiple layers of the bi-directionally or the uni-directionally oriented synthetic glass fabric and the resin system. Foam (2) is encapsulated by the encapsulated layer (3).

Figure 2:
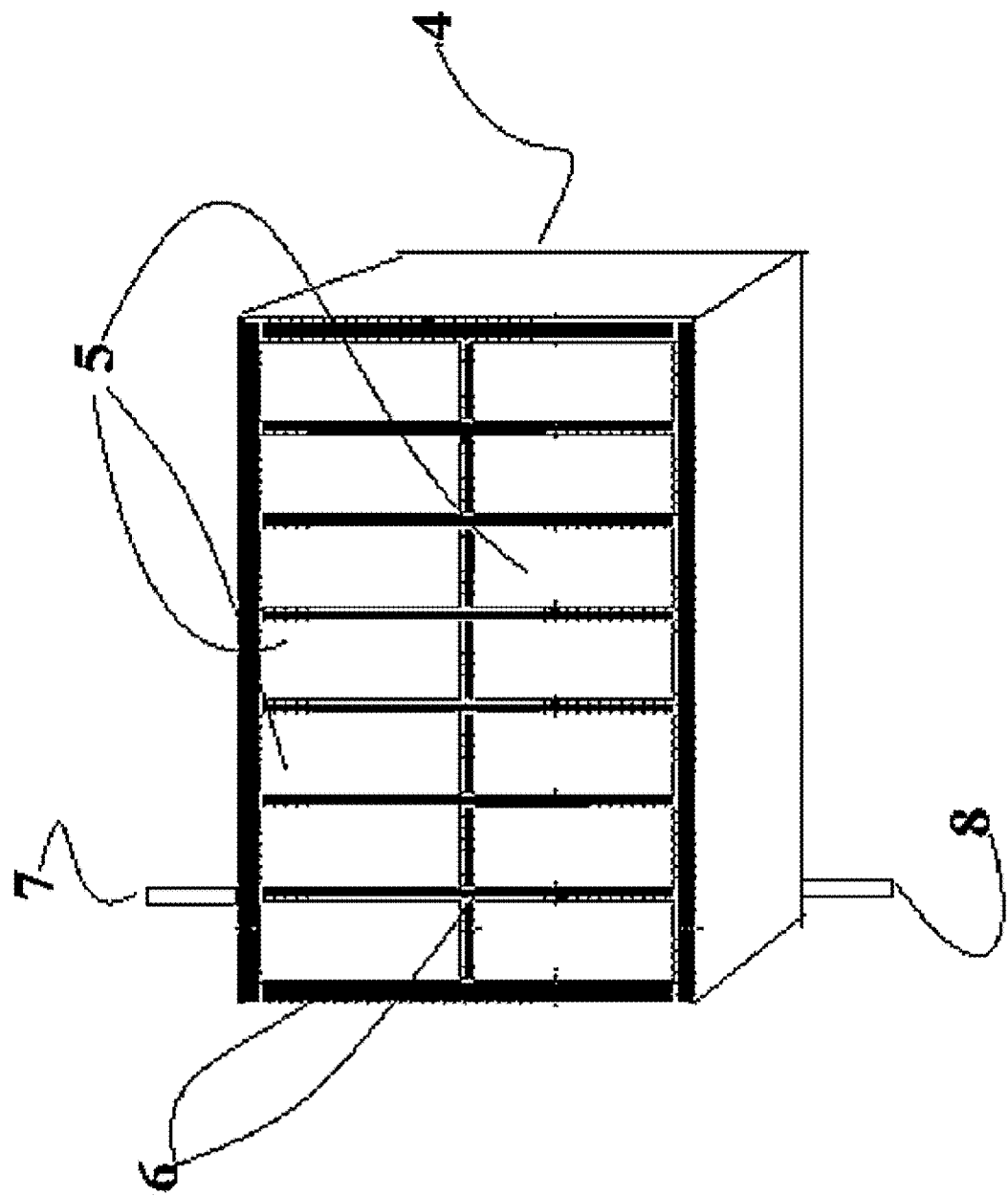
FIG. 2 illustrates the open top view of an assembly to manufacture the lightweight composite deck panel of the invention.

FIG. 2 illustrates the open top view of the assembly to manufacture the light weight composite deck panel of the invention. The assembly comprises a predefined shaped box (4) having multiple inflatable silicone bladders (5) arranged in a predefined manner having inlet (8) connected to the bladders at the bottom of the box to purge the air to inflate the bladders. A cavity (6) is created between the multiple bladders and inner periphery of the box to accommodate multiple predefined sized foams being core encapsulated with multiple layers of the bi-directionally or the uni-directionally oriented synthetic glass fabric. An inlet (7) is provided at the bottom side of the box to infuse the resin system into the assembly to fill up the cavity.

Detailed Description of the Invention:

The present invention as described below, it is to be understood that this invention is not limited to particular embodiments, drawings, methodologies and materials described, as these may vary as per the person skilled in the art. It is also to be understood that the terminology used in the description is for the purpose of describing the particular embodiments only and is not intended to limit the scope of the present invention.

Before the present invention is described, it is to be understood that unless defined otherwise, all technical and scientific terms used herein have the same meaning as commonly understood by one of ordinary skill in the art to which this invention belongs. Further, it is to be understood that the present invention is not limited to the methodologies and materials similar or equivalent to those described herein can be used in the practice or testing of the present invention, the preferred methods and materials are described, as these may vary within the specification indicated. Unless stated to the contrary, any use of the words such as "including," "containing," "comprising," "having" and the like, means "including without limitation" shall not be construed to limit any general statement that it follows to the specific or similar items or matters immediately following it. Embodiments of the invention are not mutually exclusive, but may be implemented in various combinations. The described embodiments of the invention and the disclosed examples are given for the purpose of illustration rather than limitation of the invention as set forth the appended claims. Further the terms disclosed embodiments are merely exemplary methods of the invention, which may be embodied in various forms.

It is also to be understood that the terms "a", "an", "the" and like are words for the sake of convenience and are not to be construed as limiting terms. Moreover, it will be understood that the illustrations are for the purpose of describing a particular exemplary embodiment of the invention and are not limited to the invention thereto.

The term "fibers" or "fiber" or "fabric" or "fabrics" are interchangeable and intend to cover single as well as plural fiber or fabric.

According to one of the embodiments of the invention, there is provided the light weight composite deck panel consisting of at least two predefined shaped and sized foams that are encapsulated with multiple layers of the bi-directionally and/or the uni-directionally oriented synthetic glass fabric and the resin system and the encapsulated foams arranged in a predefined configuration of the deck with at least one joint; the composite deck panel is cured at ambient temperature i.e. 25 to 35° C.

Typically, the foam used in the present invention is an expandable polystyrene foam or a crosslinked polyethylene foam.

Typically, the predefined shape of the foam is a cube, a cuboid, a cylindrical, a triangular prism, a triangular base pyramid or any other suitable shape.

Typically, the predefined size of the foam is as per the size suitable for the end application.

Typically, the foam is encapsulated with 6 to 8 layers of bi-directionally and/or uni-directionally synthetic glass fabric.

The bi-directionally and/or uni-directionally synthetic glass fabric is optionally replaced by mat prepared from the bi-directionally and/or uni-directionally synthetic glass fabric.

The bi-directionally and/or uni-directionally synthetic glass fabric is optionally replaced by the fabric or mat of polyester, carbon, aramid, basalt and mixtures thereof.

Typically, the synthetic fabric used is oriented either uni-directionally and/or bi-directionally.

Typically, the synthetic fabric used has a moisture content of 5% or less and weight of 200 to 1000 gm/m2, and tensile strength of 400 to 500 MPa.

Typically, the weight of synthetic fabric used is 200 to 500 gm/m2.

Typically, the resin system used in the present invention comprises of at least a resin; a curing system comprising a curing agent and an accelerator; filler; thinner; pigment; or any other suitable additives.

Typically, the resin used in the resin system is either a thermosetting resin selected from unsaturated polyester, epoxy, polyurethane, phenolic resins and mixture thereof or a thermoplastic resin selected from polyethylene, polypropylene, acrylonitrile-butadiene-styrene, polyacetal, polyamide, polyimide, saturated polyester resins and mixtures thereof.

Particularly, the curing agent used in the resin system is selected from methyl ethyl ketone peroxide, cumene hydroperoxide, t-butyl hydroperoxide, benzoyl peroxide, and/or hydrogen peroxide.

Typically, the accelerator used in the resin system is selected from cobalt naphthenate and/or cobalt octoate. Typically, the filler used in the resin system is calcium carbonate. Typically, the thinner is methanol. For example, the resin systems used in the present invention are:
 the resin system comprises epoxy resin and hardener or curing agent in the ratio of 10:1 to 5:1;
 the resin system comprises at least 100 parts polyester resin, at least 1.7 pph curing system, at least 2 pph filler and at least 10 pph thinner.

Particularly, the second resin system comprises 100 parts polyester, 1.7 pph curing system comprising 0.2 pph cobalt octoate and 1.5 pph Methyl Ethyl Ketone Peroxide (MEKP), 2 pph calcium carbonate and 10 pph methanol.

According to another embodiment of the invention, there is provided an assembly to manufacture the light weight composite deck panels of the invention; the assembly comprises:
 a predefined shaped box having at least two inflatable silicone bladders arranged in a predefined manner;
 one inlet connected to the bladders at a bottom of the box to purge air to inflate the bladders;
 at least one cavity between the bladders and an inner periphery of the box to accommodate multiple predefined shaped and sized foams being core encapsulated with multiple layers of the bi-directionally and/or uni-directionally oriented synthetic glass fabric;
 another inlet at the bottom side of the box to infuse the resin system into the assembly to fill up the cavity; and
 a cover provided with an outlet to close the box.

Typically, the outlet provided on the cover is connected to a vacuum pump.

Typically, the silicone bladders are inflated to arrange itself into a predefined manner and shape so that they force to align multiple predefined shaped and sized foams being core encapsulated with multiple layers of the bi-directionally and/or uni-directionally oriented synthetic glass fabric in the cavity created between the bladders and the inner periphery of the box in a predefined manner.

Besides aligning multiple predefined shaped and sized foams being core encapsulated with multiple layers of the bi-directionally and/or uni-directionally oriented synthetic glass fabric in the cavity created between the bladders and the inner periphery of the box in the predefined manner, the inflated bladders also exert pressure over the cavity comprising multiple aligned predefined shaped and sized foams being core encapsulated with multiple layers of the bi-directionally and/or uni-directionally oriented synthetic glass fabric and the resin system to remove excess resin system available in the cavity through the outlet provided over the cover of the box.

Blow compression is carried out by inflating the bladders in the closed box to initiate curing of the composite deck panels of the invention.

In one of the embodiments of the invention, the assembly is made up of a rectangular shaped box (4) having an inner dimension (i.e. length×width×depth) of 1800 mm×1200 mm×120 mm. There are 14 inflatable bladders (5) arranged in the box (4) as illustrated in the FIG. 3) to create a cavity (6) between multiple bladders (5) and an inner periphery of the box (4). The multiple predefined shaped and sized foams encapsulated by the multiple layers of the bi-directionally and/or uni-directionally oriented synthetic glass fabric are placed in the cavity (6) to cover it completely. The inlet (8) provided at the bottom of the box is connected to all inflating bladders (5) to purge air into them to inflate the bladders during the manufacturing process of the invention so as to align the multiple predefined shaped and sized foams encapsulated with multiple layers of the bi-directionally and/or uni-directionally oriented synthetic glass fabric in the cavity (6) in a predefined manner. The box is closed with cover provided with an outlet connected to a vacuum pump. The vacuum is applied to achieve vacuum of 0.4 bars within the assembly. The inlet (7) provided at the bottom side of the box (4) is connected to the cavity (6) to infuse the resin system into the cavity (6). Blow compression is carried out for 30 minutes. This assembly is used to manufacture a composite deck panel structure (1) of dimension (i.e. length×width×depth) of 1800 mm×1200 mm×120 mm. The weight is 18 Kg/m2 which is less than that of panel of same dimension made from thermoplastic by injection moulding which is 25 Kg/m2.

According to yet another embodiment of the invention, there is provided a process for the manufacture of the light weight composite deck panel of the invention by using the assembly of the invention; the process comprising:

placing multiple predefined shaped and sized foams being core encapsulated with multiple layers of the bi-directionally and/or uni-directionally oriented synthetic glass fabric in the cavity (6) created between multiple bladders (5) and the inner periphery of the box (4) in the predefined manner;

closing the box (4) with cover provided with an outlet connected to a vacuum pump;

inflating the bladders (5) by purging air through the inlet (8) provided at the bottom of the box (4) to align multiple predefined shaped and sized foams being core encapsulated with multiple layers of the bi-directionally and/or uni-directionally oriented synthetic glass fabric in the predefined manner in the cavity (6) created between multiple bladders (5) and the inner periphery of the box (4);

applying a vacuum though the outlet by using the vacuum pump to achieve at least 0.4 bar vacuum within the box (4);

infusing the resin system through inlet (7) provided at bottom side of the box (4) in the assembly to accommodate the resin system in the cavity (6); and carrying out curing at ambient temperature i.e. 25 to 35° C. for at least 30 minutes.

Typically, the encapsulation of the predefined shaped and sized foams with multiple layers of the bi-directionally and/or uni-directionally oriented synthetic glass fabric is carried out by filament winding method or any other conventional method.

Typically, the composite deck panel (1) of the invention comprises 80 to 82% of foam, 6 to 8% of bi-directionally or uni-directionally oriented synthetic glass fabric and 12 to 14% of the resin system (Volume/Volume).

Typically, the dimensions as well as shape and configuration of the deck panel (1) can be altered or adapted to be suitable for the end application.

Typically, the light weight composite deck panel (1) of the invention is used in various applications such as deck panelling structures including floors, walls, roofs, bridges, bridge roadway decking, etc.

Typically, the light weight composite deck panels (1) of the invention have at least 26 to 31% of reduction in weight as compared to that of thermoplastic panel made by injection moulding of the same dimension.

Typically, the composite deck panels (1) of the invention have the following advantages:

They are light weight as compared to that of the existing deck panelling made up of metal or thermoplastic material using injection moulding;

They have bending deflection in the range of 3-4 mm when 400 mm thick layer of concrete is casted on the panel;

They have sustained maximum hanging span of 1800 mm with 400 mm thick layer of concrete casted thereon;

They have improved strength and resistance properties over the conventional ones;

They are reusable for multiple times thus increasing durability and decreasing the cost;

They can be easily assembled; and

They can be easily handled compared to that of conventional panels made up of metal, concrete and thermoplastics.

The present invention is described in the example given below; further these are provided only to illustrate the invention and therefore should not be construed to limit the scope of the invention.

EXAMPLE 1

A deck panel structure (1) of dimension (i.e. length×width×depth) of 1800 mm×1200 mm×120 mm.

The assembly was made up of rectangular shaped box (4) having inner dimensions (i.e. length×width×depth) of 1800 mm×1200 mm×120 mm. There were 14 inflatable bladders (5) arranged in the box (4) as illustrated in FIG. 3) to create a cavity (6) between multiple bladders (5) and inner periphery of the box (4). The multiple different sized crosslinked polyethylene foams i.e. 2 numbers of foam of size of 1800 mm×55 mm×113 mm (i.e. length×width×depth), 2 numbers of foam of size of 1076 mm×55 mm×113 mm (i.e. length×width×depth), 6 numbers of foam of size of 1076 mm×30 mm×114 mm (i.e. length×width×depth), and 7 numbers of foam of size of 208 mm×30 mm×114 mm (i.e. length×width×depth) were encapsulated or wrapped by 8 layers of the bi-directionally and uni-directionally oriented synthetic glass fabric. The encapsulated foams were placed in the cavity (6) to cover it completely. Box (4) was closed with the cover provided with an outlet connected to a vacuum pump. The air was purged through inlet (8) provided at the bottom of the box (4) connected to all inflatable bladders (5) to inflate the bladders which aligned the foams encapsulated with 8 layers of the bi-directionally and uni-directionally oriented synthetic glass fabric placed in the predefined manner in the cavity (6). Vacuum was applied through outlet by using the vacuum pump to achieve at least 0.4 bar vacuum within the box (4). The resin system comprising 100 parts polyester (Netpol™ 1011), 1.7 pph curing system comprising 0.2 pph cobalt octoate and 1.5 pph methyl ethyl ketone peroxide, 2 pph calcium carbonate and 10 pph methanol was infused through the inlet (7) provided at the bottom side of the box (4) connected to the cavity (6). The infused resin system was filled into the cavity (6). The infusion of the resin system was stopped upon complete filling of the cavity (6) with the resin system as it oozed out. The inflated bladders imposed the compression to remove excess of the resin system followed by curing at 30° C. for 60 minutes. Upon curing, the deck panel structure (1) of dimension (i.e. length×width×depth) of 1800 mm×1200 mm×120 mm was obtained. The weight of the deck panel was 18.5 Kg/m2. The composite deck panel comprised of 81.6% of foam, 6% of bi-directionally and uni-directionally oriented synthetic glass fabric and 12.4% of the resin system (Volume/Volume).

This deck panel has bending deflection of 3.6 mm and sustain maximum hanging span of 1800 mm under the load of 400 mm thick concrete casted without breaking.

EXAMPLE 2

A deck panel structure (1) of dimension (i.e. length×width×depth) of 1800 mm×1200 mm×120 mm.

The assembly was made up of rectangular shaped box (4) having inner dimensions (i.e. length×width×depth) of 1800 mm×1200 mm×120 mm. There were 14 inflatable bladders (5) arranged in the box (4) as illustrated in FIG. 3) to create a cavity (6) between multiple bladders (5) and inner periphery of the box (4). The multiple different sized expandable polystyrene foams i.e. 2 numbers of foam of size of 1800 mm×55 mm×113 mm (i.e. length×width×depth), 2 numbers of foam of size of 1076 mm×55 mm×113 mm (i.e. length×width×depth), 6 numbers of foam of size of 1076 mm×30 mm×114 mm (i.e. length×width×depth), and 7 numbers of foam of size of 208 mm×30 mm×114 mm (i.e. length×width×depth) were encapsulated or wrapped by 8 layers of the bi-directionally and uni-directionally oriented synthetic glass fabric. The encapsulated foams were placed in the cavity (6) to cover it completely. Box (4) was closed with the cover provided with an outlet connected to a vacuum pump. The air was purged through inlet (8) provided at the bottom of the box (4) connected to all inflatable bladders (5) to inflate the bladders which aligned the foams encapsulated with 8 layers of the bi-directionally and uni-directionally oriented synthetic glass fabric placed in the predefined manner in the cavity (6). Vacuum was applied through outlet by using the vacuum pump to achieve at least 0.4 bar vacuum within the box (4). The resin system comprising 100 parts epoxy resin and 10 pph amine-based hardener (LAPDX® L-12/K-6) was infused through the inlet (7) provided at the bottom side of the box (4) connected to the cavity (6). The infused resin system was filled into the cavity (6). The infusion of the resin system was stopped upon complete filling of the cavity (6) with the resin system as it oozed out. The inflated bladders imposed the compression to remove excess of the resin system followed by curing at 30° C. for 60 minutes. Upon curing, the deck panel structure (1) of dimension (i.e. length×width×depth) of 1800 mm×1200 mm×120 mm was obtained. The weight of the deck panel was 18 Kg/m2. The composite deck panel comprised of 81.6% of foam, 6% of bi-directionally and uni-directionally oriented synthetic glass fabric and 12.4% of the resin system (Volume/Volume).

This deck panel has bending deflection of 3.6 mm and sustain maximum hanging span of 1800 mm under the load of 400 mm thick concrete casted without breaking.

The composite deck panels (1) prepared according to the examples 1 to 2 have the following advantages:
Top ply is not required as inbuilt composite skin of the panels gives finish form on de-shuttering;
Repelling to cement which facilitates easy de-shuttering of member after complete curing of concrete;
The deck panels (1) have sustained maximum hanging span of 1800 mm with 400 mm thick layer of concrete casted thereon;
The deck panels (1) have bending deflection in the range of 3-4 mm when 400 mm thick layer of concrete is casted on the panel;
The deck panels (1) provide flexibility to use them in casting concrete slab/beams, walls and columns;
The deck panels (1) facilitate maximum concrete slab casting of 400 mm;
Numbers of props required per sq. mt. is 0.27; and
Durability: Higher cyclic repeatability without compromising allowable bend deflection in casting 400 mm slab.

Comparative Example 1

Thermoplastic composite (Polypropylene/HDPE) deck panel of dimension (i.e. length×width×depth) of 1350 mm×900 mm×100 mm was manufactured by injection moulding and used for the comparative study.

The weight of the thermoplastic deck panel was 26 Kg/m2.

The deck panel of the comparative example 1 has the following disadvantages:
Top ply required to give finish form on de-shuttering;
Not repellent to cement which will make difficult de-shuttering of member after complete curing of concrete;
It may be used only for columns making as they do not sustain maximum hanging span of 1800 mm even with 200 mm thick layer of concrete casted thereon;
Number of props required per sq. mt. is 0.58; and
Durability: Low cyclic repeatability due to higher creep and stress relaxation of thermoplastics.

Thus, weight of the deck panel of the invention manufactured according to examples 1 and 2 reduced by 26 to 31% over the deck panel manufactured according to the comparative example 1.

The bending deflection, hanging span, strength, resistance properties and durability of the deck panels of the invention manufactured according to examples 1 and 2 improved over the deck panel manufactured according to the comparative example 1.

The invention claimed is:

1. A light weight composite deck panel comprising:
at least two shaped foams each encapsulated within bi-directionally and/or uni-directionally oriented glass fabric and a resin system, wherein the shaped foams are arranged in a deck configuration, wherein the composite deck panel is cured, and wherein the resin system includes,
a resin, and
a curing system including,
a curing agent including at least one of, methyl ethyl ketone peroxide, cumene hydroperoxide, t-butyl hydroperoxide, benzoyl peroxide, and hydrogen peroxide, and an accelerator including at least one of cobalt naphthenate and cobalt octoate,
wherein the resin system includes polyester, cobalt octoate, methyl ethyl ketone peroxide, calcium carbonate, and methanol.

2. The composite deck panel of claim 1, wherein the shaped foams are at least one of an expandable polystyrene foam and a crosslinked polyethylene foam.

3. The composite deck panel of claim 1, wherein the shape foams are at least one of a cube, a cuboid, a cylindrical, a triangular prism, and a triangular base pyramid.

4. The composite deck panel of claim 1, wherein the bi-directionally and/or uni-directionally synthetic fabric forms a mat.

5. The composite deck panel of claim 1, wherein the glass fabric is at least one of a polyester, carbon, aramid, and basalt.

6. The composite deck panel of claim 1, wherein the fabric has a moisture content of 5% or less, a weight of 200 to 1000 gm/m$^2$, and a tensile strength of 400 to 500 MPa.

7. The composite deck pane of claim 1, wherein the resin system further includes filler, thinner, and pigment.

8. The deck panel of claim 1, wherein the shaped foams are each encapsulated in at least eight layers of the fabric.

* * * * *